United States Patent
Mukhopadhyay et al.

(10) Patent No.: US 7,793,188 B2
(45) Date of Patent: Sep. 7, 2010

(54) APPARATUS AND METHOD FOR IMPROVING RELIABILITY OF COLLECTED SENSOR DATA OVER A NETWORK

(75) Inventors: Shoubhik Mukhopadhyay, La Jollla, CA (US); Sujit Dey, San Diego, CA (US); Debashis Panigrahi, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 914 days.

(21) Appl. No.: 10/592,924

(22) PCT Filed: Mar. 23, 2005

(86) PCT No.: PCT/US2005/009701

§ 371 (c)(1),
(2), (4) Date: Sep. 14, 2006

(87) PCT Pub. No.: WO2005/094493

PCT Pub. Date: Oct. 13, 2005

(65) Prior Publication Data

US 2008/0250301 A1    Oct. 9, 2008

Related U.S. Application Data

(60) Provisional application No. 60/555,596, filed on Mar. 23, 2004.

(51) Int. Cl.
G06F 11/30       (2006.01)
G08C 25/00       (2006.01)
H03M 13/00       (2006.01)
H04L 1/00        (2006.01)

(52) U.S. Cl. ...................... 714/746; 356/460
(58) Field of Classification Search .................. 714/746; 356/460
See application file for complete search history.

(56) References Cited

U.S. PATENT DOCUMENTS

| | | | |
|---|---|---|---|
| 5,874,942 A * | 2/1999 | Walker | 345/158 |
| 6,148,280 A * | 11/2000 | Kramer | 702/153 |
| 6,240,372 B1 * | 5/2001 | Gross et al. | 702/71 |
| 6,346,911 B1 * | 2/2002 | King | 342/357.06 |
| 6,475,153 B1 * | 11/2002 | Khair et al. | 600/485 |
| 6,611,726 B1 * | 8/2003 | Crosswhite | 700/99 |
| 6,704,890 B1 | 3/2004 | Carotti et al. | |
| 2003/0185317 A1 | 10/2003 | Borowski et al. | |
| 2003/0222820 A1 | 12/2003 | Karr et al. | |
| 2004/0005017 A1 | 1/2004 | Borowski et al. | |

OTHER PUBLICATIONS

M. Deistler and W. Scherrer, "Identification of Linear Systems from Noisy Data", *IEEE*, Dec. 1991, pp. 1662-1699.

(Continued)

*Primary Examiner*—Sam Rizk

(74) *Attorney, Agent, or Firm*—Greer, Burns & Crain Ltd.

(57) ABSTRACT

Apparatus and method suitable for improving reliability of collected sensor data over a network. One or more transient errors are predicted and corrected using correlation of collected data. For example, sensor data can be collected from one or more sensor nodes in a network. A device other than a sensor node can use the data to develop a predictive model based upon inherent redundancy in the sensor data, and correct one or more later-received values deemed unreliable.

25 Claims, 5 Drawing Sheets

OTHER PUBLICATIONS

P. Lettieri, et al., "Low power error control for wireless links," in Proceedings of $3_{rd}$ annual ACM/IEEE Intl. conference on Mobile computing and networking (MOBICOM), 1997.

Y. Zhao and S. Dey, "Separate Dual Transistor Registor-an Circuit Solution for on-line Testing of Transient Errors in UDSM-IC," in Proceedings of Intl. On-Line Testing Symposium 2003, Kos Island, Greece, 2003.

E. Elnahrawy and B. Nath, "Cleaning and Querying Noisy Sensors," in Proceedings of Second ACM Intl. Workshop on Wireless Sensor Networks and Applications (WSNA), San Diego, CA, 2003.

S. Mukhopadhyay, D. Panigrahi, S. Dey, "Data aware, Low cost Error correction for Wireless Sensor Networks," in Proceedings of IEEE Wireless Communications and Networking Conference (WCNC), Mar. 23, 2004.

S. Mukhopadhyay and S. Dey, "Low-cost, Reliable data Aggregation Techniques for Wireless Sensor Networks," Department of Electrical and Computer Engineering, University of California, San Diego, Power Point Presentation, slides 1-10, http://esdat.ucsd.edu/projects/relSens/index.html#presentations, May 2003.

S. Mukhopadhyay, D. Panigrahi, S. Dey, "Model Based Error Correction for Wireless Sensor Networks", 2004. IEEE SECON 2004, 2004 First Annual IEEE Communications Society Conference on, vol., Iss., 4-7, Oct. 2004, pp. 575-584.

H. Zhu, J. Chen, J. Jiang, "Classification and Representation of change in Spatial Database for Incremental Data Transfer," Geoscience and Remote Sensing Symposium, 2005. IGARSS '05. Proceedings, 2005 IEEE International, vol. 6, Iss., Jul. 25-29, 2005, pp. 3990-3993.

S. Dey, S. Mukhopadhyay, D. Panigrahi, "Low Cost, Reliable Data Aggregation Techniques for Sensor Networks", Department of Electrical and Computer Engineering, University of California, San Diego, http://esdat.ucsd.edu/projects/relSens/index.html, Feb. 9, 2005.

P. Lettieri, et al., "Low power error control for wireless links," in Proceedings of 3rd annual ACM/IEEE Intl. conference on Mobile computing and networking (MOBICOM), 1997.

Y. Zhao and S. Dey, "Separate Dual Transistor Registor-an Circuit Solution for on-line Testing of Transient Errors in UDSM-IC," in Proceedings of Intl. On-Line Testing Symposium 2003, Kos Island, Greece, 2003.

E. Elnahrawy and B. Nath, "Cleaning and Querying Noisy Sensors," in Proceedings of Second ACM Intl. Workshop on Wireless Sensor Networks and Applications (WSNA), San Diego, CA, 2003.

S. Mukhopadhyay, D. Panigrahi, S. Dey, "Data aware, Low cost Error correction for Wireless Sensor Networks," in Proceedings of IEEE Wireless Communications and Networking Conference (WCNC), Mar. 23, 2004.

S. Mukhopadhyay and S. Dey, "Low-cost, Reliable data Aggregation Techniques for Wireless Sensor Networks," Department of Electrical and Computer Engineering, University of California, San Diego, Power Point Presentation, slides 1-10, http://esdat.ucsd.edu/projects/relSens/index.html#presentations, May 2003.

S. Mukhopadhyay, D. Panigrahi, S. Dey, "Model Based Error Correction for Wireless Sensor Networks", 2004. IEEE SECON 2004, 2004 First Annual IEEE Communications Society Conference on, vol., Iss., 4-7, Oct. 2004, pp. 575-584.

H. Zhu, J. Chen, J. Jiang, "Classification and Representation of change in Spatial Database for Incremental Data Transfer," Geoscience and Remote Sensing Symposium, 2005. IGARSS '05. Proceedings, 2005 IEEE International, vol. 6, Iss., Jul. 25-29, 2005, pp. 3990-3993.

S. Dey, S. Mukhopadhyay, D. Panigrahi, "Low Cost, Reliable Data Aggregation Techniques for Sensor Networks", Department of Electrical and Computer Engineering, University of California, San Diego, http://esdat.ucsd.edu/projects/relSens/index.html, Feb. 9, 2005.

* cited by examiner

```
90   for each sample at time n,
92     observe value Y(n)
94     for each path i from root to leaf in PHT
96       Y'(n, i) = Predict (model, data & error history for path i)
98       E(n, i) = Y(n) - Y'(n, i)

100      PathErr(i) = $\frac{1}{N_i} \sum_{j=n-K}^{n} E^2(j, i)$ where $N_i$ = No. of nodes in path i using predicted values
       end
102    find i = $i_{min}$ which minimizes PathErr(i);
104    <Yc(n-K), E(n-K)> = updatePHT($i_{min}$, Y'(n, i), Y(n))
     end updatePHT(i, Y'(n', j), Y(n)):
     begin
106    find s = level 1 node containing path i
         [ out of Y'(n-K) and Y(n-K) ]
108    <y, e> = Y and E values of node s
110    PHT ← subtree of PHT rooted in s
112    to each leaf node j of new PHT, add 1st child Y(n),
         and if (|E(n,j)| > ETH) add 2nd child Y'(n, j)
116    return <y,e>
     end
```

FIG. 5

APPARATUS AND METHOD FOR IMPROVING RELIABILITY OF COLLECTED SENSOR DATA OVER A NETWORK

PRIORITY CLAIM

Applicants claim priority benefits under 35 U.S.C. §119 on the basis of patent application Ser. No. 60/555,596, filed Mar. 23, 2004.

TECHNICAL FIELD

A field of the invention is sensor networks.

BACKGROUND ART

The convergence of techniques for sensing, communication, and processing has led to the emergence of wireless sensor networks. Recently, large-scale sensing has become feasible with the use of low-cost, low-energy wireless sensor nodes. Many systems, for example in manufacturing, testing, and monitoring, collect data from a number of wireless sensors. The availability of these sensor networks enables sensing and monitoring of the physical world.

Even more so than in other applications that use wireless data transfer, providing reliable data collection is a paramount concern in sensor networks, as the data is collected, processed, and used to make decisions in a machine-to-machine data collection framework. However, there are well-known problems with wireless data transfer relating to the reliability and correction of data.

For example, a wireless network of sensor nodes is inherently exposed to various sources of unreliability, such as unreliable communication channels, node failures, malicious tampering of nodes, and eavesdropping. Sources of unreliability can be generally classified into two categories: faults that change behavior permanently; and failures that lead to transient deviations from normal behavior, referred to herein as "soft failures".

Soft failures occur in wireless channels as transient errors, caused by noise at the receiver, channel interference, and/or multi-path fading effects. Additionally, the use of aggressive design technologies such as deep-sub-micron (DSM) and ultra-deep-sub-micron (UDSM) to reduce the cost of each node further exposes the nodes to different types of transient errors in computations and sensing.

Most techniques for gauging reliability of sensor nodes place a high overhead on the collection. Typical existing reliability methods may add redundant hardware or transmit extra data at the source to correct for data corrupted in the circuits or the communication channels respectively. This makes typical methods prohibitively expensive for use with heavily constrained sensor nodes. To address failures in circuits and communication channels, such methods incur high overhead in terms of energy budget, as well as design and manufacturing cost for the sensor nodes.

Other prior methods for data correction include methods to correct soft failures in hardware as well as those to correct bit detection errors on a wireless communication channel. Techniques for correcting soft errors in hardware include both circuit-level and module-level approaches, e.g. triple modular redundancy and error correction coding in hardware. Techniques for correcting bit detection errors on a wireless communication channel include parity-based forward error correction (FEC) coding techniques like channel coding, and retransmission-based techniques like ARQ.

DISCLOSURE OF THE INVENTION

Preferred embodiments of the present invention provide, among other things, an apparatus and method suitable for improving reliability of collected sensor data over a network. One or more transient errors are predicted and corrected using correlation of collected data. For example, sensor data can be collected from one or more sensor nodes in a network. A device other than a sensor node can use the data to compute a predictive model based upon inherent redundancy in the data, and correct one or more later-received values deemed unreliable.

Further features and advantages will become apparent from the following and more particular description of exemplary embodiments of the invention, and as illustrated in the accompanying drawings.

BRIEF DESCRIPTION OF THE DRAWINGS

FIG. 5 shows exemplary pseudo-code for implementing a data aggregation and correction method, according to a preferred embodiment of the present invention.

BEST MODE OF CARRYING OUT THE INVENTION

Figure 1:
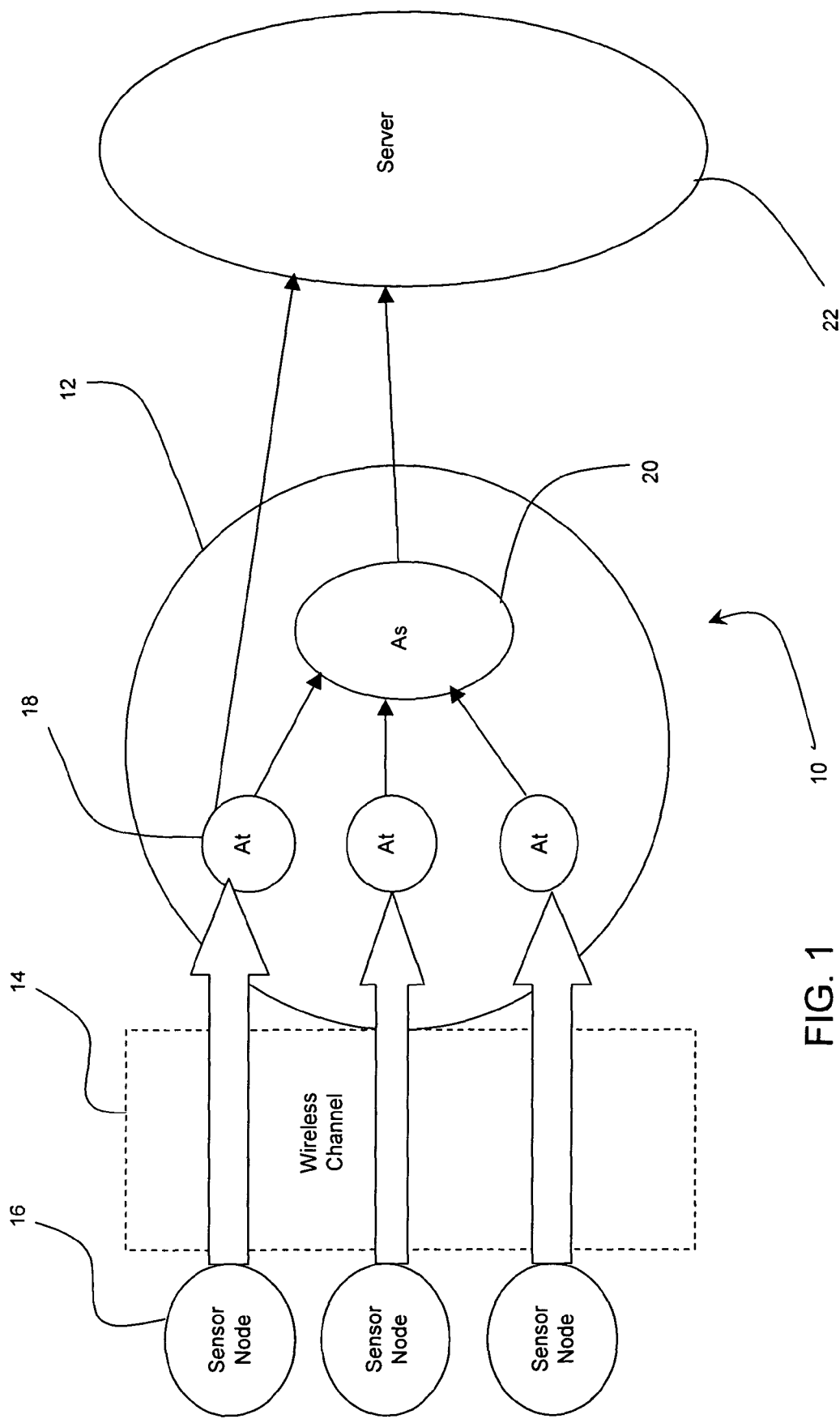
FIG. 1 shows a network including a device used to perform a data aggregation and correction method according to a preferred embodiment of the present invention.

Preferred embodiments of the invention provide improved reliability with minimal cost of error protection, i.e., the cost of sensor nodes and communication overhead. In preferred embodiments, run-time correction of transient errors originating either at the circuits of the sensor nodes or over the communication channel is conducted, with no design or operational overhead on the sensor node.

According to preferred embodiments of the invention, knowledge of the properties of the sensor data itself is used to achieve data checking and correction. Embodiments of the invention use information about correlations in sensor data, the goals of the sensor application, and its vulnerability to various errors.

For example, sensor data generally exhibits redundancy over a temporal period on a per-node basis, or over a cluster of nodes. Such inherent redundancy of the sensor data may be leveraged to make possible a high degree of reliability in data collection, without imposing overheads on sensor nodes, at the expense of nominal buffer requirements at data aggregator nodes, which are much less cost/energy constrained. Low-cost error correction apparatuses, systems, and methods for correcting soft failures according to preferred embodiments of the present invention are provided using the properties of data captured in a data prediction model.

Prior reliability techniques, by contrast, either added redundant hardware or transmitted extra data at the source to correct for data corrupted in the circuits or the communication channels, respectively. Such techniques are prohibitively expensive to be used with heavily constrained sensor nodes, and they do not use properties of the application data. Thus, to address failures in circuits and communication channels, these techniques incur prohibitively high overheads in terms of energy budget, in addition to design and manufacturing cost in the sensor nodes.

An embodiment of the invention includes an application-level, data-aware method, for example implemented in software or encoded into a suitable device, for correction of transient errors in sensor data at an aggregation node, where aggregation and filtering of the sensor data occur in a sensor data network. Preferred methods achieve run-time correction of data received from a data source, such as sensor nodes, over wireless communication channels, preferably without imposing any design or material cost, or performance overhead, on the sensor nodes. Preferably, the overhead incurred is solely in terms of storage and computation costs at the data receiver, such as aggregator node(s) that buffer data for aggregation. The method preferably can be tuned to the performance requirements of the application and resource constraints at the aggregator.

Generally, a preferred method identifies and uses redundancies within the sensor data to correct the presence of transient errors. In exemplary embodiments, a detailed analysis of redundancy within sensor data captures correlation properties in a predictive model. The predictive model is then used during data acquisition for on-line predictive correction of the data. This preferred method filters soft failures of the sensor data.

More particularly, in exemplary embodiments a device, such as an aggregator node, develops a predictive model based on analysis of sensor data from sensor nodes of a network. The aggregator node then conducts a reliability check at run-time using the predictive model to check for reliability of received data from the sensor nodes and to make error correction decisions. Preferred methods of the invention include collecting data offline for an inherent sensor data predictive model, and applying the model on-line at run-time.

While data predictions typically filter out the majority of errors in the observed values, it is possible that the predictions may not always track the data processes correctly. For example, aggregation operations performed by applications on collected data have varying levels of vulnerability to erroneous data. Preferred methods of the present invention thus also delay the reporting of data within an application's delay constraints. The delayed reporting allows observed values to be used in a preferably small set of later samples to guide the choice of corrected value between the predicted and observed value. Past data samples may also be used to help choose a corrected value. The preferred method can be tuned to the computational resources available at the data receiver and the application's delay requirements by adjusting the delay.

A network embodiment of the invention includes one or more sensor nodes that wirelessly communicate data to one or more aggregator nodes. The inherent redundancy of the sensor data is utilized to perform error correction at the site of data processing, which can, for example, be the aggregator node. This is beneficial, as the aggregator node typically has more computational, storage, and energy resources than the sensor nodes. Additional embodiments of the invention include an aggregator node configured for use in a wireless network.

Referring now to the drawings, FIG. 1 shows a sensor network 10 that includes a device configured to perform an exemplary method according to the present invention. Preferably, the device is an aggregator node 12, which over a wireless channel 14 receives data from a data source. The data source includes, for example, one or more sensor nodes 16, and preferably a plurality of sensors, which transmit data wirelessly via the channel 14. Preferably, the network 10 includes multiple aggregator nodes 12, though only one is shown in FIG. 1 for clarity.

The aggregator node 12 may include, for example, one or more modules for receiving and aggregating sensor data. The aggregation functions performed by these modules may include node-level or temporal aggregation 18 for aggregating data from a particular sensor and/or spatial or cluster-level aggregation 20, which aggregate data from the different sensor nodes. Aggregated and corrected data from the aggregator node 12 may in turn be sent to a server 22 or other device (i.e., reported) for processing or storage.

Figure 2:
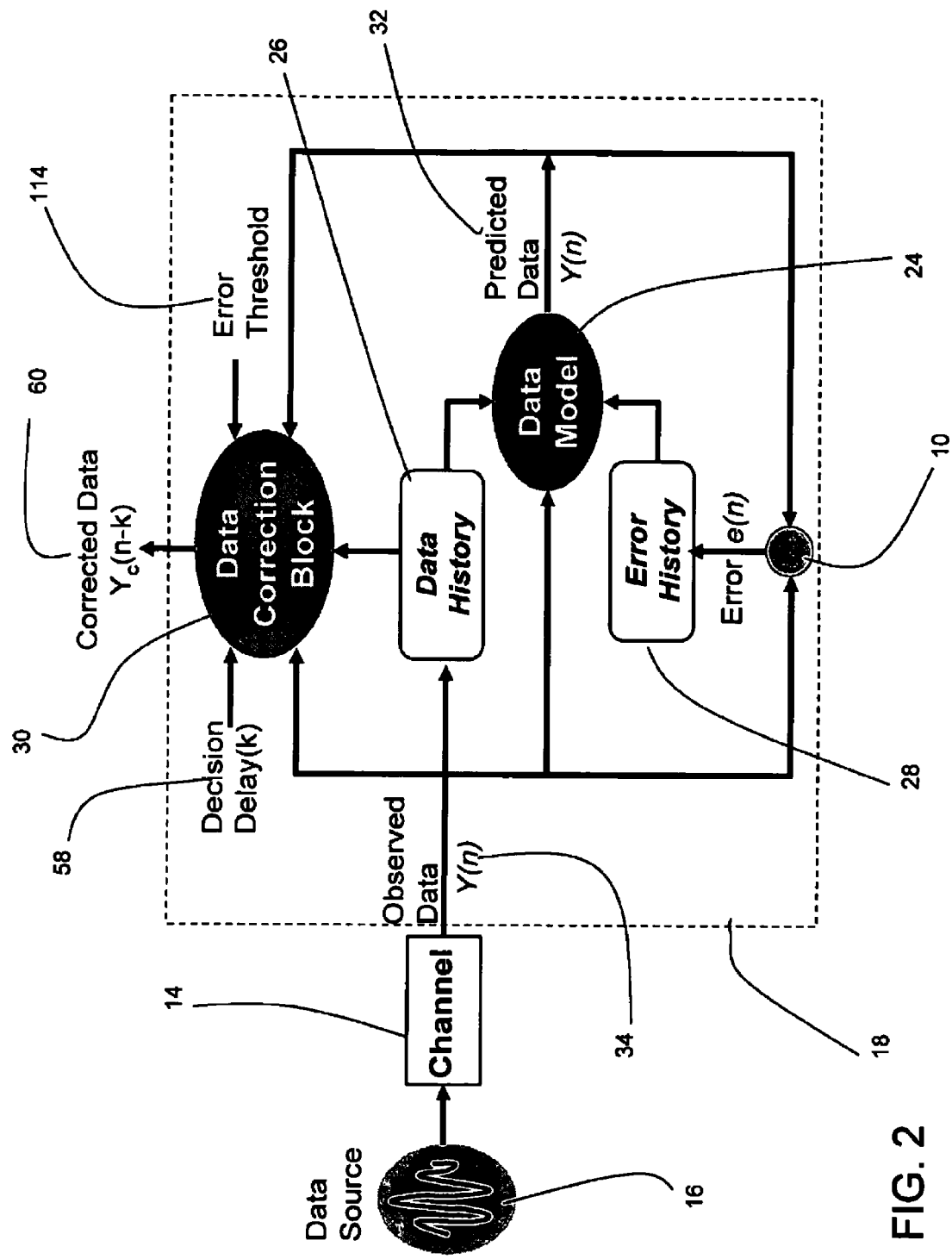
FIG. 2 schematically illustrates an algorithm implemented by an aggregator node for aggregating and correcting data from a data source, according to a preferred embodiment of the present invention.

FIG. 2 shows a general schematic of an application-level algorithm for performing a data correction method according to preferred embodiments of the present invention. The algorithm may be implemented in a device such as the aggregator node 18, for example, by any suitable method.

In an exemplary sensor data correction method, a predictive model of the data generation process is constructed, preferably offline, by pre-processing of initially collected data (representative samples) from the sensor nodes 16. For example, suitable pre-processing logic, shown in FIG. 2 as a data model block 24, may be implemented in the aggregator node 12. This predictive model utilizes the correlation in the sensor data. Preferably, the correlation is temporal, in which case the predictive model preferably is computed based on inherent temporal (per-node) redundancy in the sensor data. However, it is contemplated that other types of correlation may be additionally or alternatively used.

A model chosen should be rich enough for the predictions to substantially match the data generation process. Also, the model should allow a prediction process that is efficient in terms of resource consumption and complexity to meet any performance requirements of the aggregator node 12, or other device. The choice of model generated by the data model block 24 given the above requirements preferably will depend mostly on the level and nature of temporal correlation in the data. Though a variety of modeling techniques can be used to represent data correlation properties, the performance of the correction method largely depends on the accuracy of modeling and the efficiency of the predictions. An exemplary model, used in experiments to test embodiments of the invention, is the auto-regressive moving average (ARMA) model. This is a linear predictive model that uses the history of previous observations, shown in FIG. 2 as a data history block 26, as well as that of prediction performance, shown as an error history block 28. Order identification (that is, the number of past values and error history to be used for computing the new predicted value) for the ARMA model may be performed by, for example, using the minimum final prediction error criterion.

Figure 3:
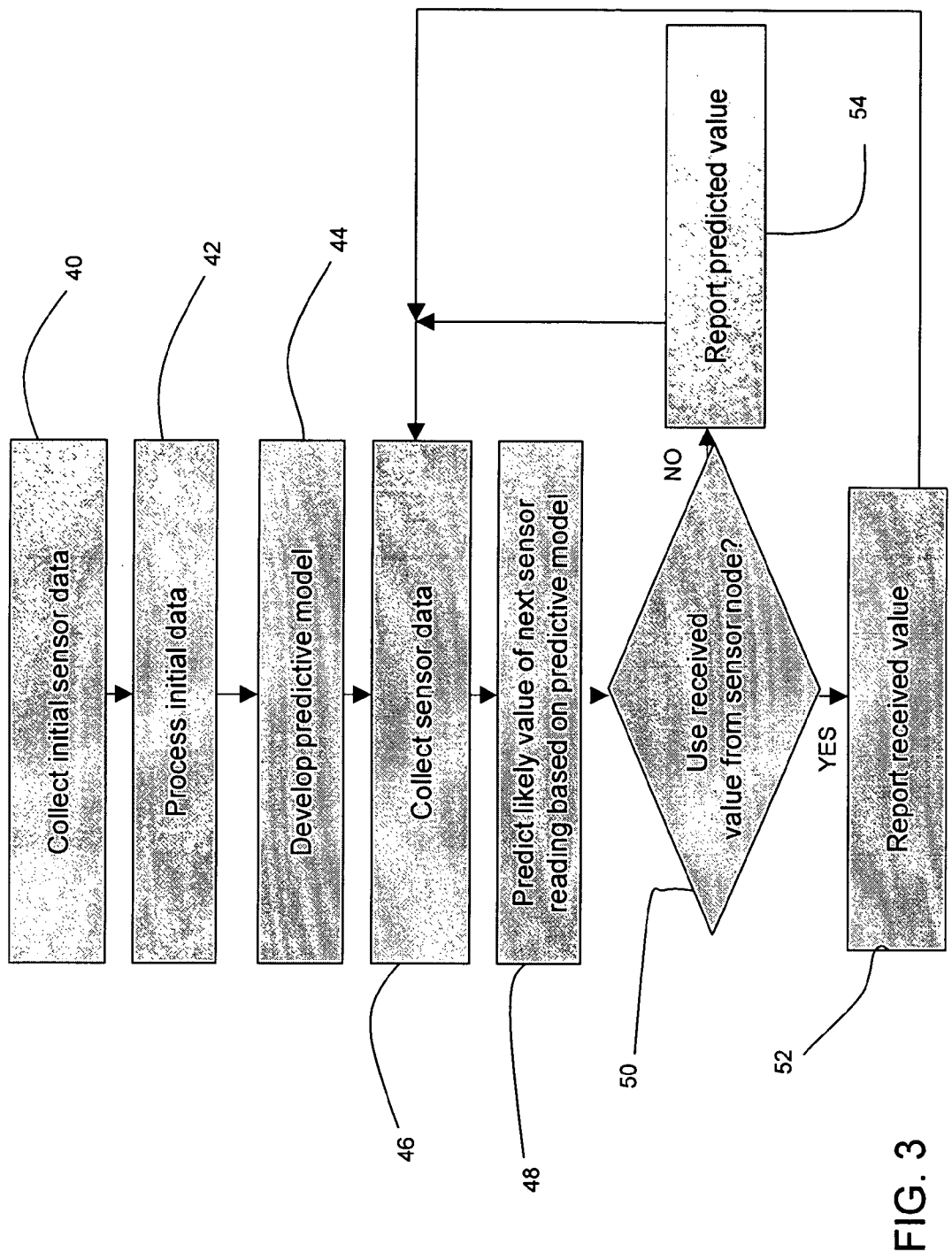
FIG. 3 illustrates an exemplary operation for performing data correction, according to a preferred embodiment of the present invention.

As also shown in FIGS. 2 and 3, this predictive model is used at run-time for computing the likely value of the next reading, and the data correction method determines, based on the histories of observed data and prediction errors, whether the value obtained from the sensor or that provided by the predictive model will be recorded or reported and used for future use. Put another way, the data correction may determine whether a value obtained by the sensor is reliable with respect to the likely value, and if not, it corrects or filters the value using a predicted value.

This may be implemented, for example, via application-level predictive correction logic, shown in FIG. 2 as a data correction block 30. A preferred approach includes maintaining a history of observed data (data history block 26), and using the computed predictive model to generate a predicted future value 32 from the history. After the next observed data value 34 is received from the sensor node 16, it is decided which of these candidate values to record. Preferably, the operation of the data correction block 30 is independent of the data model used for prediction. However, it is contemplated that the logic 30 for predictive correction may partially or fully overlap the logic 24 used for forming the predictive model.

In a general data correction method, as shown in FIG. 3, the data model block 24 of the aggregator node 12 wirelessly collects initial data from the sensor node 16 (step 40), processes the initial data (step 42), and develops a predictive model (step 44) based on the processed initial data. During run-time operation the aggregator node 12 wirelessly receives and/or collects observed sensor data (step 46), and a likely value of the next reading from the sensor node 16 is predicted using the developed data model (step 48). Then, the data correction block 30 determines whether to use the received value (step 50), by determining the reliability of the received value. If the received value is reliable, this value is reported (step 52) as corrected data. If not, a transient error has been predicted by the aggregator node 12. In this case, the predicted value is reported (step 54) as corrected data to correct the transient error.

A significant issue in performing prediction-based correction is choosing how to handle mismatches between a predicted and observed value at the receiver (i.e., the aggregator node 12), which may have been caused by a genuine error or by departure of the data source's behavior from the model. Such errors should be handled differently in these two cases. In preferred embodiments of the invention this decision is made based on past samples as well as a number of samples observed afterwards. This is performed using a delay, represented in FIG. 2 by a decision delay parameter (K) 58.

Referring again to FIG. 2, Y represents the sequence of observed values 34 of sensor data, Y' represents the results of a prediction block (predicted data 32), and $Y_C$ represents the corrected values 60 from the data correction block 30. The data correction block 30 uses the predictive model developed by the data model block 24 in the process of correcting errors by generating and storing different possible versions of the history of different predictions. At any point in time n, given observed data Y(n) 34, the data correction block 30 computes the corrected value $Y_C$(n−K) 60, where K represents the depth of the prediction history maintained for a posteriori correction.

Figure 4:
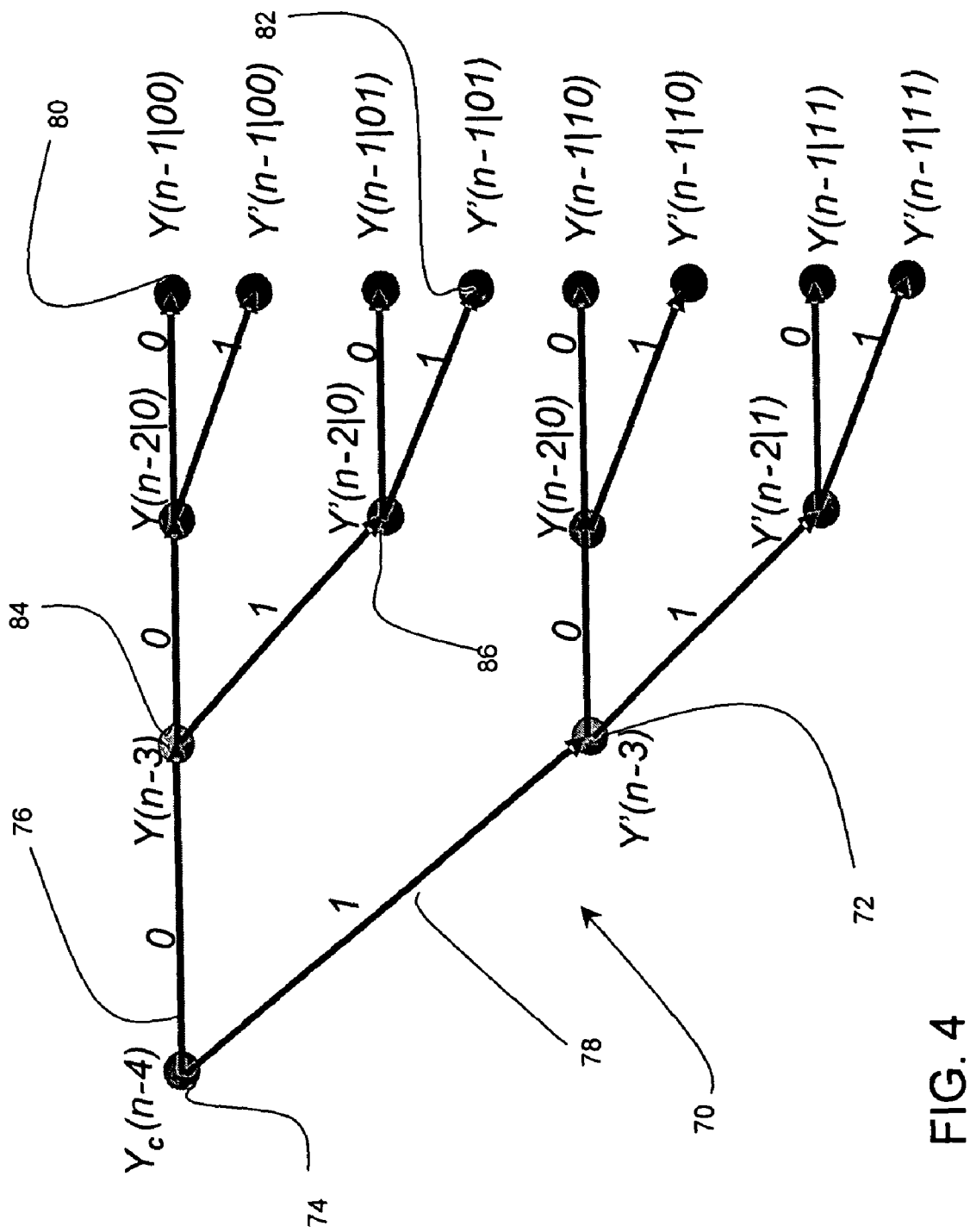
FIG. 4 shows an exemplary prediction history tree (PHT) for a delay of 3 samples, according to an exemplary embodiment of the present invention.

For example, and referring to FIG. 4, for a time n, the observed values up to Y(n) and the corresponding predictions up to Y'(n) are used, after a delay of K samples, to report the corrected value $Y_C$(n−K) 60. For every sample of the sensor node 16 observed, the data correction block 30 compares it with the value predicted from the predictive model and past history, and attempts to report the value closer to the actual expected observation. The delaying of this decision allows the step to consider the effect of any choice it makes on the prediction accuracy for the K samples following it.

In preferred embodiments, this delayed decision making is implemented using a prediction history tree (PHT) 70, which contains the possible predicted values and the corresponding prediction errors for the past K samples. The prediction errors corresponding to each node's value in the PHT are stored in a parallel error history tree (not shown), which is maintained in sync with the PHT 70 by performing the same update operations on both trees.

An exemplary PHT 70 has a depth of K+1, and represents the various potential values for the last K samples, i.e., $Y_c$(i)

where i=n−K:n−1. FIG. 4 shows an example of a PHT 70 for K=3. Each node 72 in any level j of the PHT 70 represents a possible value of $Y_c$(n−K+j−1), with the root node (level 0) 74 denoting the value already chosen for $Y_c$(n−K−1).

Every node has two outgoing paths 76, 78, labeled 0 and 1, respectively, in FIG. 4. These represent the choices of Y (observed value) and Y' (predicted value) respectively for the sample following it. Thus, every path from root to a leaf 80 in level K+1 denotes a series of up to $2^K$ choices leading to a sequence of values $Y_c$(n−K:n−1). The nodes 72 of the PHT in FIG. 4 are annotated with the possible values contained in them. For example, leaf node 82, annotated with Y'(n−1|01), represents the predicted value Y'(n−1) obtained after following the path from the root node 74 through node 84 and node 86, corresponding to the choices of 011 from the root node.

Preferred methods use the PHT to select a value for forwarding to the server 22. An exemplary pseudo-code of a method used to correct errors at the receiver using the PHT is shown in FIG. 5. At time n (step 90), observed value Y(n) is received (step 92), and up to $2^K$ possible predicted values for that sample are computed, one for each path i (step 94) from the root to every leaf node. Each predicted value Y'(n, i) is computed (step 96) using a different set of data and error history based on the nodes on that path. Also, for every path, prediction error is computed (step 98), and the average prediction error per sample is computed (PathErr) using the prediction error (step 100). Based on the minimum path error, one of the child nodes of the root of the PHT is selected (step 102) as the new root, and the content of the selected child node determines the corrected value of $Y_c$(n−K) (steps 104, 106). The tree rooted at this child is then used to replace the PHT structure.

For example, the next-level PHT is generated (step 104). In a preferred method for generating the PHT, the level 1 node (for example, node 84 in FIG. 4) is selected containing the path i (step 106). This node becomes node s. The observed and error values for node s are used for the corrected value $Y_c$ and the prediction error reported to the application, as well as entered into the data and error history (step 108) The sub-tree rooted at the other branch from the root is discarded (step 110), and the remaining tree is extended another level (step 112) by adding one or two children (observed Y(n) and prediction Y'(n) for that path) to each leaf node.

To improve efficiency, the size of the prediction history (that is, the PHT) can be somewhat reduced by assuming very small variations from the predictions to be due to randomness in the sensed physical process rather than transient errors. As an exemplary implementation, an error threshold value ETH 114 may be used as a control parameter in a preferred method to avoid adding new Y'(n) values if E(n) is below ETH (step 116). This means that if that particular leaf node becomes the root after N steps, the observed value Y should be used for Yc. Thus, the tree structure often will not be fully populated.

The choice of delay value K determines, apart from the delay in reporting the corrected values, the level of correction achieved by the preferred data correction method under particular given data and error characteristics. The storage and computational complexity of the method also depend directly on the parameter K, since it determines the amount of history information used for correcting each sample. Since a preferred method distinguishes between modeling errors and real random errors occurring in the sensor node 16 and/or the wireless channel 14, the optimum choice of K depends on the properties of the errors as well as the performance of the modeling technique used. Potentially, it is also possible to trade off correction accuracy against performance and resources by varying K, and match them to the application requirements and constraints of the aggregator node 12.

The performance of a preferred correction method depends partly on the performance of the prediction algorithm. The prediction algorithm preferably is invoked for each path of every sample to predict the next value in that sequence. The primary resource consumed by the correction block is storage, the space complexity being $O(2^K)$ for the PHT 70.

In these ways, for example, the delay may be tuned to a particular device, such as the aggregator node 12, or the wireless sensor network 10 by selection of K and by forming the PHT 70 based on the selected K. Different depths of prediction histories may be used depending on the application's delay sensitivity, the relative error levels, and the resource constraints on the receiving node.

A number of methods, devices, and systems for data aggregation and correction have been shown and described, having many features and advantages. By performing preferred data correction methods at the application level, design of a device or system implementing the method can be made easier. By using the aggregator node 12 to perform data correction steps, overhead on the sensor nodes 16 is not increased, and computations can be performed using a device typically having far greater overhead. Use of a delay improves the efficacy of a preferred method, and the delay can be chosen to tune the method to various devices or systems. An error threshold preferably reduces unnecessary overhead on the aggregator nodes 12.

Though various configurations of sensor networks are possible according to embodiments of the present invention, preferred data aggregation and corrections methods are particularly useful within network architectures that include large numbers of cheap and light sensor nodes managed by aggregator nodes with comparatively larger energy and resource budgets.

While specific embodiments of the present invention have been shown and described, it should be understood that other modifications, substitutions and alternatives are apparent to one of ordinary skill in the art. Such modifications, substitutions, and alternatives can be made without departing from the spirit and scope of the invention, which should be determined from the appended claims.

Various features of the present invention are set forth in the appended claims.

The invention claimed is:

1. A method of filtering transient errors in data collected comprising:
    collecting initial sensor data over a wireless channel from at least one sensor;
    correlating said collected initial sensor data;
    receiving additional data over the wireless channel from the at least one sensor;
    predicting transient errors in said received additional data using said correlating; and
    correcting the predicted transient errors based at least in part on said correlating.

2. The method of claim 1, wherein said correcting includes delaying the data.

3. The method of claim 2, wherein said delaying the data comprises tuning the amount of delay to a particular wireless sensor network.

4. The method of claim 3, wherein said tuning the delay comprises forming a prediction history tree.

5. The method of claim 2, wherein said delaying the data comprises forming a prediction history tree.

6. The method of claim 1, wherein said correlation includes autoregressive moving average correlation.

7. The method of claim 1, wherein said predicting and correcting are performed by a wireless device other than the at least one sensor node.

8. A network comprising:
    at least one sensor; and
    a device configured to receive sensor data over a wireless channel from the at least one sensor, the received sensor data including initial sensor data and additional sensor data;
    said device being configured to generate offline a predictive model at least partly based on per-sensor redundancy in the initial sensor data;
    said device further configured to determine partly based on the predictive model whether to correct the additional data received from the at least one sensor.

9. The network of claim 8 in which the at least one sensor is one device.

10. The network of claim 8 in which the predictive model is a linear model.

11. A device, comprising:
    first logic configured to generate offline a predictive model at least partly based on per-node redundancy in sensor data received wirelessly from at least one sensor node; and
    second logic configured to determine while online whether to correct additional observed data received wirelessly from the at least one sensor node based on the predictive model.

12. The device of claim 11 wherein the first logic includes at least a portion of the second logic.

13. The device of claim 11 wherein the second logic includes at least a portion of the first logic.

14. The device of claim 11 wherein the first logic and the second logic do not overlap.

15. A method for improving reliability of collected sensor data over a network, the method comprising:
    wirelessly collecting initial sensor data from one or more sensor nodes in the network;
    pre-processing of the initial sensor data to determine a level of inherent temporal redundancy in the initial sensor data;
    developing a predictive model based upon the determined level of inherent temporal redundancy in the initial sensor data;
    wirelessly receiving an additional sensor reading from the one or more sensor nodes;
    computing a likely value of the additional sensor reading based upon the predictive model;
    determining whether a value of the additional sensor reading is reliable with respect to the likely value, and, if not, correcting the value of the additional sensor reading.

16. The method of claim 15, wherein said collecting initial sensor data, said pre-processing of initial sensor data, and said developing a predictive model are performed offline.

17. The method of claim 15, wherein the one or more sensor nodes comprises a plurality of sensor nodes;
    wherein the inherent temporal redundancy in the initial sensor comprises per-node redundancy for each of the plurality of sensor nodes.

18. The method of claim 15, wherein the predictive model comprises an auto-regressive moving average (ARMA) model.

19. The method of claim 15, wherein said computing the likely value of a next sensor reading is further based on a history of previously-received sensor data and a history of errors.

20. The method of claim 15, wherein said correcting comprises determining, for a sample n, a corrected value $Y_C(n-K)$, where K is a decision delay, in number of samples.

21. The method of claim 20, wherein said determining a corrected value further comprises forming a prediction history tree including paths representing choices between the value received from the sensor and a predicted value.

22. A method for improving reliability of collected sensor data over a wireless network, the method comprising:
   computing the likely value of a next sensor reading from a sensor node in the network based upon a predictive model based upon inherent temporal redundancy in sensor data;
   wirelessly receiving a value from the sensor node; and
   determining whether the value received from the sensor node is reliable with respect to the likely value, and, if not, correcting the value received from the sensor node.

23. The method of claim 22, wherein said computing the likely value of a next sensor reading is further based on a history of previously-received sensor data and a history of errors.

24. The method of claim 22, wherein said correcting comprises determining, for a sample n, a corrected value $Y_C(n-K)$, where K is a decision delay, in number of samples.

25. The method of claim 24, wherein said determining a corrected value further comprises forming a prediction history tree including paths representing choices between the value received from the sensor and a predicted value.

* * * * *

UNITED STATES PATENT AND TRADEMARK OFFICE
CERTIFICATE OF CORRECTION

PATENT NO. : 7,793,188 B2  
APPLICATION NO. : 10/592924  
DATED : September 7, 2010  
INVENTOR(S) : Mukhopadhyay et al.

Page 1 of 1

It is certified that error appears in the above-identified patent and that said Letters Patent is hereby corrected as shown below:

Title page, Item [75] "Inventors:"

delete "La Jollla" and insert --La Jolla-- therefor.

Page 2 - delete the second column of references which contains the identical references listed in the first column of references.

Col. 7, line 46     Please delete "collected".

Signed and Sealed this  
Twenty-second Day of February, 2011

David J. Kappos  
*Director of the United States Patent and Trademark Office*